J. S. & T. B. Atterbury,

Jelly Glass.

No. 103,702.  Patented May 31, 1870.

Witnesses.
R. I. Campbell
J. N. Campbell

Inventors
James S. Atterbury
Thos. B. Atterbury
by
Mason, Fenwick & Lawrence

UNITED STATES PATENT OFFICE.

JAMES S. ATTERBURY AND THOMAS B. ATTERBURY, OF PITTSBURG, PA.

IMPROVED JELLY-GLASS.

Specification forming part of Letters Patent No. 103,702, dated May 31, 1870.

*To all whom it may concern:*

Be it known that we, JAMES S. ATTERBURY and THOMAS B. ATTERBURY, of Pittsburg, in the county of Allegheny and State of Pennsylvania, have invented a new and Improved Jelly-Glass; and we do hereby declare that the following is a full, clear, and exact description thereof, reference being had to the accompanying drawing, making part of this specification, in which—

Figure 1:
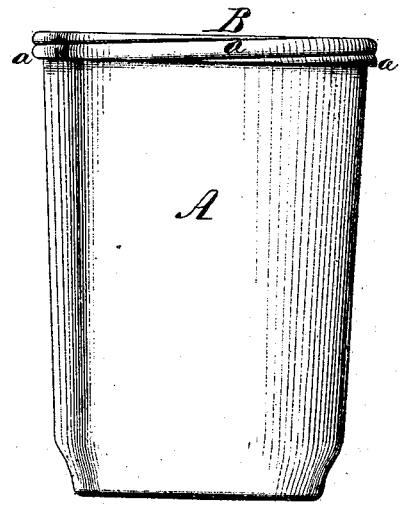
Figure 2:
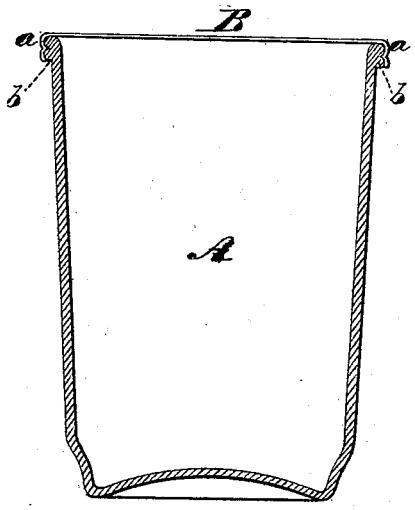

Figure 1 is a side view of the improved jelly-glass. Fig. 2 is a diametrical section through the same.

Similar letters of reference indicate corresponding parts in the two figures.

This invention relates to the improvement of an article of manufacture known as a "jelly-glass." These glasses, as hitherto made, have beads or ribs around their upper edges, by which paper or muslin covers can be tied over the glasses to preserve their contents. The paper or muslin covers are very objectionable, chiefly because they are readily broken, or perforated and destroyed by vermin.

The object of our invention is to improve this article of glass manufacture by producing a screw-thread around its upper border during the process of pressing the glass into shape in the mold, thus adapting the glass to receive and be covered by a metallic cap having a screw-thread formed on its rim.

To enable others skilled in the art to understand our invention, we will describe it.

In the accompanying drawing, A represents the body of a jelly-glass, which is contracted below and expanded above in the usual well-known manner, so that the solid contents of the glass can be nicely turned out in one mass. This jelly-glass is produced by the process of pressing the glass in a mold, during which operation a raised spiral bead or screw-thread, $b$, consisting of one or more turns, is pressed around the upper margin of the glass, as shown in Fig. 2.

A jelly-glass thus produced is adapted for receiving a metallic cover, B, having a female screw-thread, $a$, formed on its rim. This cover is preferably made of thin sheet metal pressed into shape by means of dies suitably adapted to the purpose.

We do not desire to be understood as extending our claim of invention beyond the article or commodity known as a "jelly-glass," as screw-threads for receiving sheet-metal screw-caps have been formed on glass fruit-jars and several other articles of glassware. We believe, however, that previous to our invention screws made on glass have been made by blowing the glass in molds, while we press all the screws in molds.

The screw may be substituted by inclines and lugs or parts of a screw, produced in the same manner as the full screw is produced.

What we claim as new, and desire to secure by Letters Patent, is—

The new article of manufacture herein described—to wit, the jelly cup or glass with a screw-thread pressed upon it, substantially as described.

J. S. ATTERBURY.
THOMAS B. ATTERBURY.

Witnesses:
FRIEDERICH KORB,
JOHN McCONAGHY.